Figure 1:
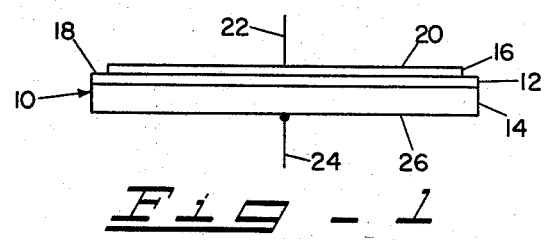

May 19, 1959     T. S. SHILLIDAY ET AL     2,887,633

TITANIUM-DIOXIDE RECTIFIERS

Filed June 9, 1955

INVENTOR.
Theodore S. Shilliday
Charles S. Peet
BY    Arthur E. Middleton

ATTORNEYS.

2,887,633
TITANIUM-DIOXIDE RECTIFIERS

Theodore S. Shilliday and Charles S. Peet, Columbus, Ohio, and Arthur E. Middleton, Indianapolis, Ind., assignors, by mesne assignments, to the United States of America as represented by the Secretary of the Air Force Application June 9, 1955, Serial No. 514,272

4 Claims. (Cl. 317—238)

This invention relates to asymmetrical electrical conductors containing titanium dioxide. In particular, this invention is concerned with rectifiers comprised of semiconducting titanium dioxide having an inorganic artificial barrier interposed in contacting relationship between the semiconductor and counterelectrode.

It is well known that such materials as galena, selenium, copper oxide, and germanium can be used in rectifiers. Although rectifiers containing these materials are useful for many purposes, they are not generally satisfactory in high-temperature operation. Selenium rectifiers are not satisfactory at temperatures over 125° C. Copper oxide is not satisfactory at over 85 to 90° C. Galena is unsatisfactory at over 70° C. and germanium is unsatisfactory at over 90° C. Solid-state theory indicates that rectification may be enhanced by the presence of an artificial-barrier layer between a metal and semiconductor. For example, organic barrier layers, such as lacquers and varnishes, have been used with success in selenium rectifiers, but have obvious maximum current and temperature limitations. It has now been found that rectification at high temperatures, for example even in excess of 200° C., is obtainable by means of rectifiers containing as one component thereof a titanium dioxide semiconductor on which is coated an inorganic artificial-barrier material.

Figure 2:
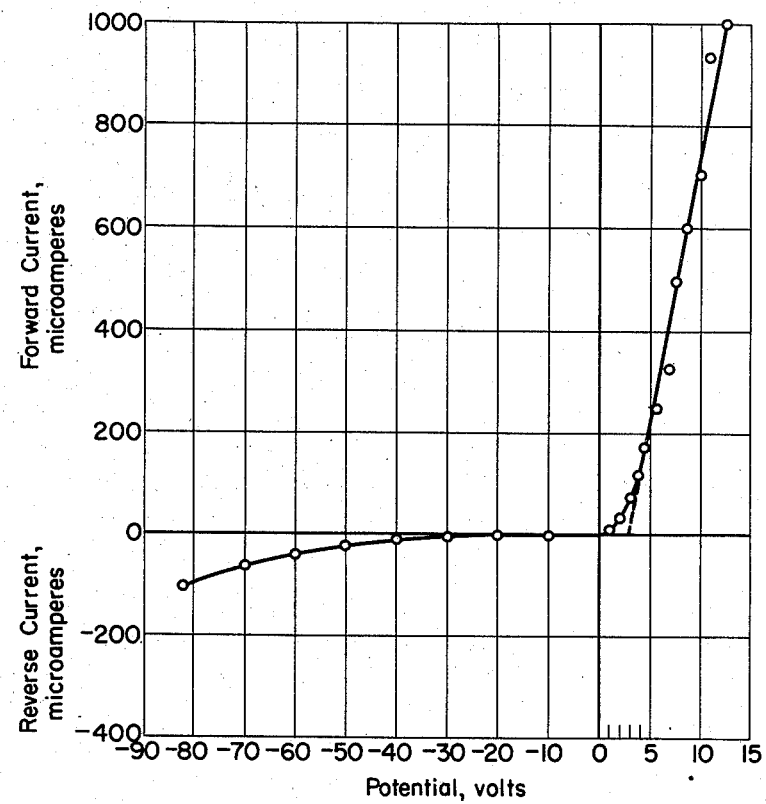

In the drawings:

Fig. 1 is a schematic diagram of a typical titanium dioxide rectifier of this invention; and Fig. 2 is a graph illustrating current-voltage characteristics of a titanium dioxide rectifier made in accordance with this invention.

Various techniques have been used to successfully produce titanium dioxide rectifiers. The titanium dioxide semiconductor has been successfully produced by oxidizing titanium metal in oxygen or steam, or by hydrostatically pressing, sintering, cutting into wafers, and reducing chemically pure titanium dioxide powder. If the proper temperatures and times are used in the former process, no reduction of the product is necessary. Among the methods of oxidizing the titanium metal to obtain a semiconducting titanium dioxide layer or film, the preferred oxidation procedure in the preparation of the titanium dioxide rectifiers is to oxidize the titanium metal at a temperature ranging from about 700° C. to about 900° C. in an oxygen atmosphere at atmospheric pressure for a period of from about one to 20 minutes. Optimum oxidation is obtained at about 825° C. for a period of about 7 minutes. Adherence of the oxide film to the titanium metal decreases as the oxidation temperature increases above about 900° C. At temperatures below about 700° C., oxidation times become excessively long and a higher resistant oxide tends to form. Of course, prior to oxidation the surface of the titanium metal is suitably cleaned in order to eliminate surface contaminants. Abrasive polishing and chemical cleaning of the metal have produced good results. When the titanium dioxide semiconductor is produced by the oxidation process, electrical contact may be made directly to the titanium metal.

The coating of the inorganic artificial-barrier material is obtained by vaporizing silicon monoxide in a vacuum and condensing the vapor on the surface of the semiconducting titanium dioxide. There is a possibility that some oxidation of the silicon monoxide may occur as the vapor is condensed on the surface of the semiconducting titanium dioxide. However, from all physical appearances, the condensed layer retains the appearance of silicon monoxide. The composition of the artificial-barrier layer may be best described as a silicon monoxide artificial-barrier layer, and such terminology, or its equivalent, accordingly is used in the disclosure and claims. The silicon monoxide artificial-barrier layer may range in thickness from about 1,000 to 5,000 angstroms. Increasing the thickness of the silicon monoxide barrier layer increases the over-all resistance of the titanium dioxide rectifier.

Referring to Fig. 1, a typical titanium dioxide rectifier, following the principles of this invention, may be constructed as follows:

A titanium metal disk, represented generally at 10, is oxidized, thereby forming a titanium dioxide film 12 on the upper surface thereof. This film is composed principally of oxygen-deficient titanium dioxide and probably small amounts of the lower oxides of titanium. The concentration of the titanium metal in the oxide film increases toward the titanium metal base 14. The oxidized titanium specimen is exposed in vacuum to vaporized silicon monoxide to produce a silicon monoxide artificial-barrier layer 16 on the upper surface 18 of the oxide film 12. A counterelectrode 22 is contacted with the upper surface 20 of the silicon monoxide artificial-barrier layer 16. The contact of the counterelectrode 22 with the upper surface 20 of the silicon monoxide artificial-barrier layer 16 may be a pressure contact, such as a probe, or may be a nonpressure-sensitive contact, as obtained by vapor-depositing or electroplating the counterelectrode on the surface 20. Electrical contact 24 may be made to the lower side 26 of the base 14 as by soldering the contact to the lower side. In the event the electrical contact 24 to the lower side 26 of the base 14 is made by soldering, the solder used must be of sufficiently high melting point so that it will not melt at the desired operating temperatures of the rectifier. The counterelectrode 22 may be composed of any of the known counterelectrode materials.

Increases in the operating temperature of a titanium dioxide rectifier reduces the height of the rectifying barrier in the rectifier. This reduction in the barrier height, due to high temperatures, is a factor limiting the high-temperature operability of titanium dioxide rectifiers. In addition to the temperature of operation, the counterelectrode employed and the method of forming the semiconductors are determining factors in the height of the barrier. The disposition of the thin layer of the silicon monoxide in contacting relationship between the counterelectrode and the titanium dioxide semiconductor creates an artificial barrier in the rectifier and effects an increase of the barrier height of the titanium dioxide rectifier. By artificially increasing the height of the barrier in the titanium dioxide rectifier in this manner, the range of the operating temperatures of the titanium dioxide rectifiers is increased.

The graph of Fig. 2 is illustrative of current-voltage characteristics of a typical titanium dioxide rectifier having the silicon monoxide barrier layer in contacting relationship, as described above, between the semiconducting titanium dioxide and a copper counterelectrode. The dashed-line continuation of the straight-line portion of the curve in Fig. 2 illustrates the barrier height of the rectifier at room temperature (about 25° C.) The barrier-height voltage is indicated at the intercept between the dashed line and the abscissa in Fig. 2. From Fig. 2 it is seen that the barrier-height voltage is about 3 volts, which is substantially larger than comparable titanium dioxide rectifiers having a copper counterelectrode, but without the silicon monoxide artificial-barrier layer. In the case of a barrier-height voltage of 3 volts, a titanium dioxide rectifier is capable of rectification at temperatures in excess of 200° C. Of course, it will be understood that the curve of Fig. 2 is illustrative of the principle of the invention, that is, that the presence of the silicon monoxide artificial-barrier layer interposed between the titanium dioxide semiconductor and the counterelectrode effects an increase in the height of the rectifying barrier of the titanium dioxide rectifier. The degree to which the barrier height is increased will vary with the particular manner of forming the titanium dioxide semiductor and the particular choice of the counterelectrode material.

In addition to illustrating the barrier-height voltage of the silicon monoxide barrier layer modified titanium dioxide rectifier, the curve of Fig. 2 also shows that the use of the silicon monoxide barrier layer serves to significantly increase the reverse breakdown voltage of the rectifier.

Although this invention is illustrated as being a point-type rectifier, this description is not intended to limit the scope of the invention. Thus, an area-type rectifier may be fabricated within the scope of the invention.

While the particular embodiments of this invention have been shown and described, it will be obvious to those skilled in the art that various changes and modifications may be made without departing from the scope of the invention in its broader aspects. Further, it is understood that the invention is not to be limited to the specific forms herein described and shown.

What is claimed is:
1. A rectifier comprising: a titanium dioxide semiconductor and a silicon monoxide artificial-barrier layer in contacting relationship between the semiconductor and a counterelectrode.
2. A rectifier comprising: a titanium dioxide semiconductor and a silicon monoxide artificial-barrier layer of from 1,000 to 5,000 angstroms thick in contacting relationship between the semiconductor and a counterelectrode.
3. Semiconducting titanium dioxide in contacting relationship with a silicon monoxide artificial-barrier layer of from 1,000 to 5,000 angstroms thick.
4. In a rectifier comprising a titanium dioxide semiconductor and a counterelectrode, the combination therewith of a silicon monoxide artificial-barrier layer of from 1,000 to 5,000 angstroms thick interposed in contacting relationship between the semiconductor and the counterelectrode.

References Cited in the file of this patent
UNITED STATES PATENTS
2,692,212   Jenkins et al. _____ Oct. 19, 1954